United States Patent
Albrecht et al.

(10) Patent No.: US 12,231,501 B2
(45) Date of Patent: Feb. 18, 2025

(54) METHOD AND SYSTEM FOR PROVIDING TIME-CRITICAL SERVICES VIA A FLOW CONTROL ENVIRONMENT

(71) Applicant: Siemens Aktiengesellschaft, Munich (DE)

(72) Inventors: Harald Albrecht, Nuremberg (DE); Michael Dreher, Leonberg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 18/682,500

(22) PCT Filed: Jul. 14, 2022

(86) PCT No.: PCT/EP2022/069739
§ 371 (c)(1),
(2) Date: Feb. 9, 2024

(87) PCT Pub. No.: WO2023/016744
PCT Pub. Date: Feb. 16, 2023

(65) Prior Publication Data
US 2024/0333799 A1  Oct. 3, 2024

(30) Foreign Application Priority Data
Aug. 13, 2021 (EP) .................................. 21191302

(51) Int. Cl.
*H04L 67/00* (2022.01)
*H04L 9/40* (2022.01)
(Continued)

(52) U.S. Cl.
CPC .......... *H04L 67/12* (2013.01); *H04L 41/0806* (2013.01); *H04L 41/0895* (2022.05);
(Continued)

(58) Field of Classification Search
CPC ... H04L 67/12; H04L 67/2895; H04L 41/122; H04L 41/0895; H04L 41/0806; H04L 63/08
See application file for complete search history.

(56) References Cited

U.S. PATENT DOCUMENTS

2020/0007948 A1  1/2020  Li et al.
2020/0028848 A1*  1/2020  Gupta .................. G06F 21/105
(Continued)

FOREIGN PATENT DOCUMENTS

CN  110572439      12/2019
CN  111557109 A    8/2020
(Continued)

OTHER PUBLICATIONS

Calcote, Lee: "Container Networking: A Breakdown, Explanation and Analysis—The New Stack"; Sep. 14, 2016 (Sep. 14, 2016), XP055885327.

*Primary Examiner* — Khai M Nguyen
(74) *Attorney, Agent, or Firm* — Cozen O'Connor

(57) ABSTRACT

A method for providing time-critical services via a flow control environment, wherein each service is assigned a server component that includes at least one application instance and that is formed by a flow control component that is loadable into the flow control environment and executed there, where an individual virtual communication network is made available for each server component via the flow control environment, a reverse proxy of a subnetwork, comprising the flow control environment, forwards service access requests, for use of the services outside of the subnetwork in accordance with predefined forwarding rules, to the respective server component via its virtual communication network, and the where the virtual communication networks are used for all application instances of the respective server component for forwarding the service access requests.

14 Claims, 2 Drawing Sheets

(51) Int. Cl.
*H04L 41/0806* (2022.01)
*H04L 41/0895* (2022.01)
*H04L 41/122* (2022.01)
*H04L 67/12* (2022.01)
*H04L 67/2895* (2022.01)

(52) U.S. Cl.
CPC ............ *H04L 41/122* (2022.05); *H04L 63/08* (2013.01); *H04L 67/2895* (2013.01)

(56) References Cited

U.S. PATENT DOCUMENTS

| | | |
|---|---|---|
| 2020/0137182 A1 | 4/2020 | Zong |
| 2021/0103457 A1 | 4/2021 | Ohira et al. |
| 2021/0185563 A1 | 6/2021 | Xu et al. |
| 2022/0052858 A1 | 2/2022 | Nakano et al. |
| 2022/0116267 A1 | 4/2022 | Tada |
| 2023/0247100 A1* | 8/2023 | Albrecht ................ H04L 67/51 709/226 |
| 2023/0261998 A1* | 8/2023 | Albrecht ................ H04L 67/12 370/235 |

FOREIGN PATENT DOCUMENTS

| | | |
|---|---|---|
| EP | 3544265 | 9/2019 |
| EP | 3751421 | 12/2020 |
| JP | 2018169978 A | 11/2018 |
| JP | 2020074604 A | 5/2020 |
| KR | 20200139748 | 12/2020 |
| WO | 2020032169 A1 | 2/2020 |
| WO | 2021/129972 | 7/2021 |
| WO | 2022042905 | 3/2022 |

* cited by examiner

METHOD AND SYSTEM FOR PROVIDING TIME-CRITICAL SERVICES VIA A FLOW CONTROL ENVIRONMENT

CROSS-REFERENCE TO RELATED APPLICATIONS

This is a U.S. national stage of application No. PCT/EP2022/069739 filed 14 Jul. 2022. Priority is claimed on European Application No. 21191302.5 filed 13 Aug. 2021, the content of which is incorporated herein by reference in its entirety.

BACKGROUND OF THE INVENTION

1. Field of the Invention

The present invention relates to a method and a system for providing time-critical services, particularly in an industrial automation system.

2. Description of the Related Art

Industrial automation systems normally comprise a multiplicity of automation devices networked with one another via an industrial communication network and, in a production automation or process automation context, serve to control or regulate plants, machines or devices. Due to time-critical underlying conditions in industrial automation systems, real-time communication protocols, such as PROFINET, PROFIBUS, real-time Ethernet or time-sensitive networking (TSN) are predominantly used for communication between automation devices. In particular, control services or control applications can be automated and can be distributed among currently available servers or virtual machines of an industrial automation system in an automated and utilization-dependent manner.

Interruptions in communication connections between computer units of an industrial automation system or automation devices can result in an unwanted or unnecessary repetition of a transmission of a service request. Furthermore, messages that are not or not completely transmitted can, for example, prevent a transition or a continuation of an industrial automation system to or in a safe operational state.

Problems can occur in Ethernet-based communication networks if network resources are used to transmit data streams or data frames with real-time requirements in contention for a transmission of data frames with substantial payload data content without special quality of service requirements. Ultimately, this can result in data streams or data frames with real-time requirements not being transmitted in accordance with a requested or required quality of service.

EP 3 751 421 A1 discloses a method for the providing control applications, where communication network addresses of flow control components that provide control applications, and also identifiers of the control components or of server devices on which the flow control components, are executed are queried by a monitoring device. A configuration control device generates configuration information for a forwarding device from the queried communication network addresses and identifiers and from designations of the control applications. The forwarding device receives requests from terminal devices for the use of the control applications and forwards them according to the configuration information to a respective flow control component.

WO 2022/042905 A1 discloses a method for providing time-critical services, where each service is assigned at least one server component that is formed by a flow control component that is loadable into a flow control environment and is executable there. A functional unit for processing a communication protocol stack is made available in each case to the server components and is connected to a functional unit assigned to the flow control environment for processing a communication protocol stack. The services each comprise a directory service component for determining services provided via the flow control environment. The directory service components are interconnected via a separate communication interface. An aggregator component formed via a further flow control component is connected to the separate communication interface and makes information available relating to services provided via the server components outside the flow control environment.

Users of control applications for industrial automation systems implemented via container virtualization or comparable virtualization concepts expect the simplest possible integration of applications of this type into their existing infrastructure. Virtualized control applications of this type are normally accessed via a reverse proxy. Automatic integration of the virtualized control applications with reverse proxies is important for both users and developers so that the virtualized control applications can be used simply and quickly. In particular, a safe separation between different virtualized control applications within an application environment is of great importance so that critical repercussions, in particular access to communication and data of other virtualized control applications, can be excluded. However, solutions have hitherto required very substantial resources and administration, and this is extremely problematic in industrial automation systems.

SUMMARY OF THE INVENTION

It is an object of the present invention to provide a device and simply implementable method for providing time-critical services that enable a safe decoupling between services provided via container virtualization or comparable virtualization concepts.

This and other objects and advantages are achieved in accordance with the invention by a system and method for providing time-critical services via a flow control environment, where each service is assigned a server component that comprises at least one application instance and is formed by a flow control component that is loadable into the flow control environment and is executable there. A dedicated virtual communication network is made available to each server component via the flow control environment. The virtual communication networks can each comprise, in particular, virtual Ethernet point-to-point connections or can be formed by a virtual bridge within the flow control environment.

The flow control components are or comprise, in particular, software containers which, are each isolated from other software containers or container groups, e.g., pods, execute within the flow control environment on a host operating system of a server device. Alternative micro-virtualization concepts, such as snaps, can essentially also be used for the flow control components. In particular, a flow control component can be loaded in each case for each application instance into the flow control environment and can be executed there. The software containers advantageously use a kernel of the host operating system of the server device, each jointly with other software containers running/executing on the respective server device. Memory mappers for the software containers can be retrieved, for example, from a storage and provisioning system to which a multiplicity of users have read or write access.

The flow control environment is preferably a container engine via which virtual resources are created, deleted or linked. The virtual resources comprise software containers, virtual communication networks and connections assigned thereto. The flow control environment can comprise, for example, a docker engine or a snap core that execute on a server device.

In accordance with the invention, a reverse proxy of a subnetwork comprising the flow control environment forwards service access requests for the use of the services outside the subnetwork in accordance with predefined forwarding rules to the respective server component via the virtual communication network of said server component. The virtual communication networks are each used for all application instances of the respective server component to forward the service access requests. In this way, the present invention enables an improved, automated network isolation of virtualized control applications or apps, in particular from control applications or apps from other providers.

In particular, users, app developers and manufacturers of controlled machines or devices require no detailed technical knowledge of a correct and safe integration of reverse proxies and apps from any providers into their respective application field. Moreover, no cluster orchestration systems which normally require substantial resources are needed for this purpose.

In accordance with the invention, a configuration unit for the reverse proxy determines globally valid access information in each case for addressing information that is valid within the subnetwork and that is assigned to the server components or their virtual communication networks, and transmits forwarding rules mapping the access information to the reverse proxy. At least one directory service component preferably makes the globally valid access information available for the use of the services outside the subnetwork.

The globally valid access information can comprise, for example, addressing information and access authorizations. The access authorizations are made available following successful authentication of a user or device. The forwarding rules advantageously form the authorizations for selected users or devices to access selected services. The addressing information valid within the subnetwork can be, for example, communication network addresses, port numbers, host names or complete domain names.

In accordance with the invention, the configuration unit evaluates event messages from the flow control environment to determine whether virtual communication networks are to be set up or deleted within the flow control environment. The configuration unit connects a virtual communication network that is to be newly set up to the reverse proxy by means of a first control command directed at the flow control environment. Conversely, the configuration unit terminates a connection between a virtual communication network to be deleted and the reverse proxy by means of a second control command directed at the flow control environment. Furthermore, once the connection between the virtual communication network to be deleted and the reverse proxy has been terminated, the configuration unit enables a removal of the respective component from the flow control environment via a third control command directed at the flow control environment. This ensures that a correct sequence for terminating the connection to the reverse proxy and for removing the respective server component is maintained. A situation in which a server component or a software container cannot be removed due to an existing connection to the reverse proxy is thus avoided.

In addition, in accordance with a particularly preferred embodiment of the present invention, the configuration unit determines whether an assigned virtual communication network is already present for a flow control component that is to be loaded into the flow control environment and is to be executed there. If the assigned virtual communication network is present, then the configuration unit instructs the flow control environment virtual communication network for a connection to use this between the flow control component and the reverse proxy. Conversely, if an assigned virtual communication network is absent, then the configuration unit advantageously instructs the flow control environment to set up a virtual communication network within the flow control environment for the server component formed by the flow control component and to use this virtual communication network to connect the flow control component to the reverse proxy. A suitable network isolation can thus be implemented for any virtualized control applications or apps according to their classification.

The system in accordance with the invention for providing time-critical services via a flow control environment is configured, in particular, to implement the method in accordance with the disclosed embodiments and comprises a flow control environment, a subnetwork comprising the flow control environment, a reverse proxy of the subnetwork, a configuration unit for the reverse proxy and a plurality of server components each assigned to a service. The server components each comprise at least one application instance and are formed by a flow control component that is loadable into the flow control environment and is executable there.

The flow control environment of the system in accordance with the invention is configured such that a dedicated virtual communication network is made available to each server component. Conversely, the reverse proxy is configured to forward service access requests for the use of the services outside the subnetwork according to predefined forwarding rules to the respective server component via the virtual communication network of the server component. In addition, the virtual communication networks are configured to each be used to forward the service access requests for all application instances of the respective server component.

The configuration unit for the reverse proxy of the system in accordance with the invention is configured in each case to determine globally valid access information in each case for addressing information that is valid within the subnetwork and is assigned to the server components or their virtual communication networks, and to transmit forwarding rules mapping the access information to the reverse proxy. Furthermore, the configuration unit is configured to evaluate event messages from the flow control environment in order to determine whether virtual communication networks are to be set up or deleted within the flow control environment.

In addition, the configuration unit of the system in accordance with the invention is configured to connect a virtual communication network that is to be newly set up to the reverse proxy via a first control command directed at the flow control environment, and to terminate a connection between a virtual communication network to be deleted and the reverse proxy via a second control command directed at the flow control environment. Once the connection between the virtual communication network to be deleted and the reverse proxy has been terminated, the configuration unit is configured to enable a removal of the respective server component from the flow control environment by means of a third control command directed at the flow control environment.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in detail below based on an exemplary embodiment with reference to the drawings, in which.

DETAILED DESCRIPTION OF THE EXEMPLARY EMBODIMENTS

Figure 1:
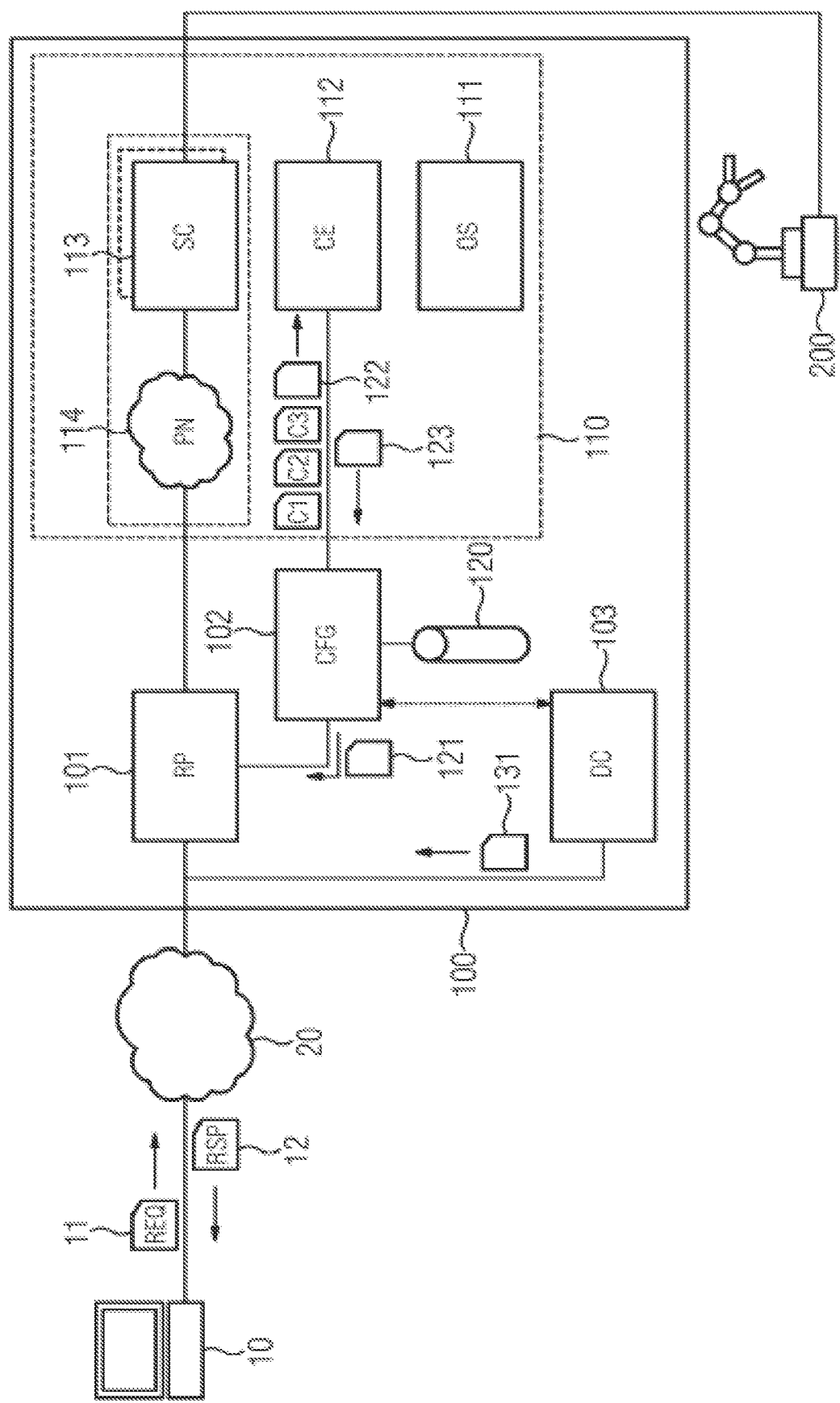
FIG. 1 shows an arrangement having a server component for providing services of an industrial automation system, and having a reverse proxy.

The arrangement shown in FIG. 1 comprises a server device 110 for providing services or control and monitoring applications of an industrial automation system, where the server includes a processor and memory. The services or control and monitoring applications of the industrial automation system are exemplary time-critical services. The services or control and monitoring applications can be provided, for example, based on Open Platform Communications Unified Architecture (OPC UA). The services or control and monitoring applications thus comprise interface definitions that can be used for permanent access to the services or control and monitoring applications.

The arrangement shown in FIG. 1 further comprises a terminal device 10 that is assigned to at least one user who, in the present exemplary embodiment, transmits service access requests 11 for the use of the services via a communication network 20 to an automation system or subnetwork 100 comprising the server device 110, and accordingly receives responses 12 or measured values and status messages from the server device. The communication network 20 can be designed, for example, as a time-sensitive network, in particular in accordance with Institute of Electrical and Electronics Engineers (IEEE) standard 802.10, IEEE standard 802.1AB, IEEE standard 802.1AS, IEEE standard 802.1BA or IEEE standard 802.1CB.

In the present exemplary embodiment, the server device 110 implements functions of control devices of an industrial automation system, such as programmable logic controllers, or functions of field devices, such as sensors or actuators, via a container-virtualized server component 113. In the present exemplary embodiment, the server device 110 serves to exchange control and measurement parameters with machines or devices 200 controlled by the server device 110. The server device 110 is provided, in particular, for determining suitable control parameters from captured measurement parameters.

In the present exemplary embodiment, the terminal device 10 is an operating and monitoring station and serves to visualize process data or measurement and control parameters which are processed or captured by the server device 110 or other automation devices. In particular, the terminal device 10 is used to display values of a control circuit and to modify control parameters or control programs.

A server component 113, which comprises at least one application instance and is formed by a flow control component which is loadable into a flow control environment 112 and is executable there, is assigned in each case to the services. In the present exemplary embodiment, a flow control component is loaded in each case for each application instance into the flow control environment 112 and is executed there. The flow control environment 112 is provided via the server device 110 and is installed there as an application on a host operating system 111 of the server device 110.

In the present exemplary embodiment, the flow control components are or comprise software containers which, isolated in each case from other software containers, container groups or pods, each execute within the flow control environment 112 on the host operating system 111 of the server device 110. The software containers use a kernel of the host operating system 111 of the server device 110, in each case jointly with other software containers running/executing on the respective server device 110. The flow control environment 112 is, in particular, a container engine via which virtual resources are created, deleted or linked. The virtual resources can comprise software containers, virtual communication networks and connections assigned thereto.

An isolation of the flow control components or an isolation of selected operating system means from one another can be implemented, in particular, via control groups and namespacing. Process groups can be defined via control groups to restrict available resources for selected groups. Individual processes or control groups can be isolated or concealed from other processes or control groups via namespaces. Memory mappers for software containers can be retrieved, for example, from a storage and provisioning system to which a multiplicity of users have read or write access.

A dedicated virtual communication network 114 is made available to each server component 114 via the flow control environment 112 for the provision of time-critical services. In particular, the virtual communication networks 114 can each comprise virtual Ethernet point-to-point connections or can each be formed by a virtual bridge within the flow control environment 112.

A reverse proxy 101 of a host system or subnetwork 100 comprising the server device 110 and the flow control environment 112 forwards the service access requests 11 for the use of the services outside the host system or subnetwork 100 according to predefined forwarding rules 121 to the respective server component 113 via the virtual the communication network 114 of said server component 113. The virtual communication networks 114 are each used to forward the service access requests 11 for all application instances of the respective server component 113.

A configuration unit 102 for the reverse proxy 101 determines globally valid access information 131 in each case for addressing information that is valid within the host system or subnetwork 100 and that is assigned to the server components 113 or their virtual communication networks 114, and transmits forwarding rules 121 mapping the access information 113 to the reverse proxy 101. The addressing information valid within the host system or subnetwork 100 comprises, for example, communication network addresses, port numbers, host names or complete domain names. The globally valid access information 131 is made available by a directory service component 103 for the use of the services outside the host system or subnetwork 100.

The globally valid access information 131 preferably comprises addressing information and access authorizations, where the access authorizations are made available only following successful authentication of a user or device. Authorizations for selected users or devices to access selected services are advantageously also mapped by the forwarding rules 121.

In addition, the configuration unit 102 determines whether an assigned virtual communication network 114 is already provided for a flow control component which is to be loaded into the flow control environment 112 and is to be executed there. In order to determine this, the configuration unit 102 accesses flow control information 122 stored in a database 120 for the server component 114 or the flow control components assigned to it.

If an assigned virtual communication network 114 is present, then the configuration unit 102 instructs the flow control environment 112, via flow control information 122 derived from the database 120, to use this virtual communication network 114 to connect the flow control component to the reverse proxy 102. Conversely, if an assigned virtual communication network 114 is absent, then the configuration unit 102 instructs the flow control environment 112 to set up a virtual communication network 114 within the flow control environment 112 for the server component 113 formed by the flow control component, and to use this virtual communication network 114 to connect the flow control component to the reverse proxy 102.

Furthermore, the configuration unit 102 evaluates event messages 123 from the flow control environment 112 to determine whether virtual communication networks 114 are to be set up or deleted within the flow control environment 112. The configuration unit connects a virtual communication network that is to be newly set up to the reverse proxy 101 by means of a first command C1 directed at the flow control environment 112.

Conversely, the configuration unit 102 terminates a connection between a virtual communication network 114 to be deleted and the reverse proxy 101 by means of a second command C2 directed at the flow control environment 112. In addition, once the connection between the virtual communication network 114 to be deleted and the reverse proxy 101 has been terminated, the configuration unit 102 enables a removal of the respective server component 113 from the flow control environment 112 by means of a third command C3 directed at the flow control environment 112.

Figure 2:
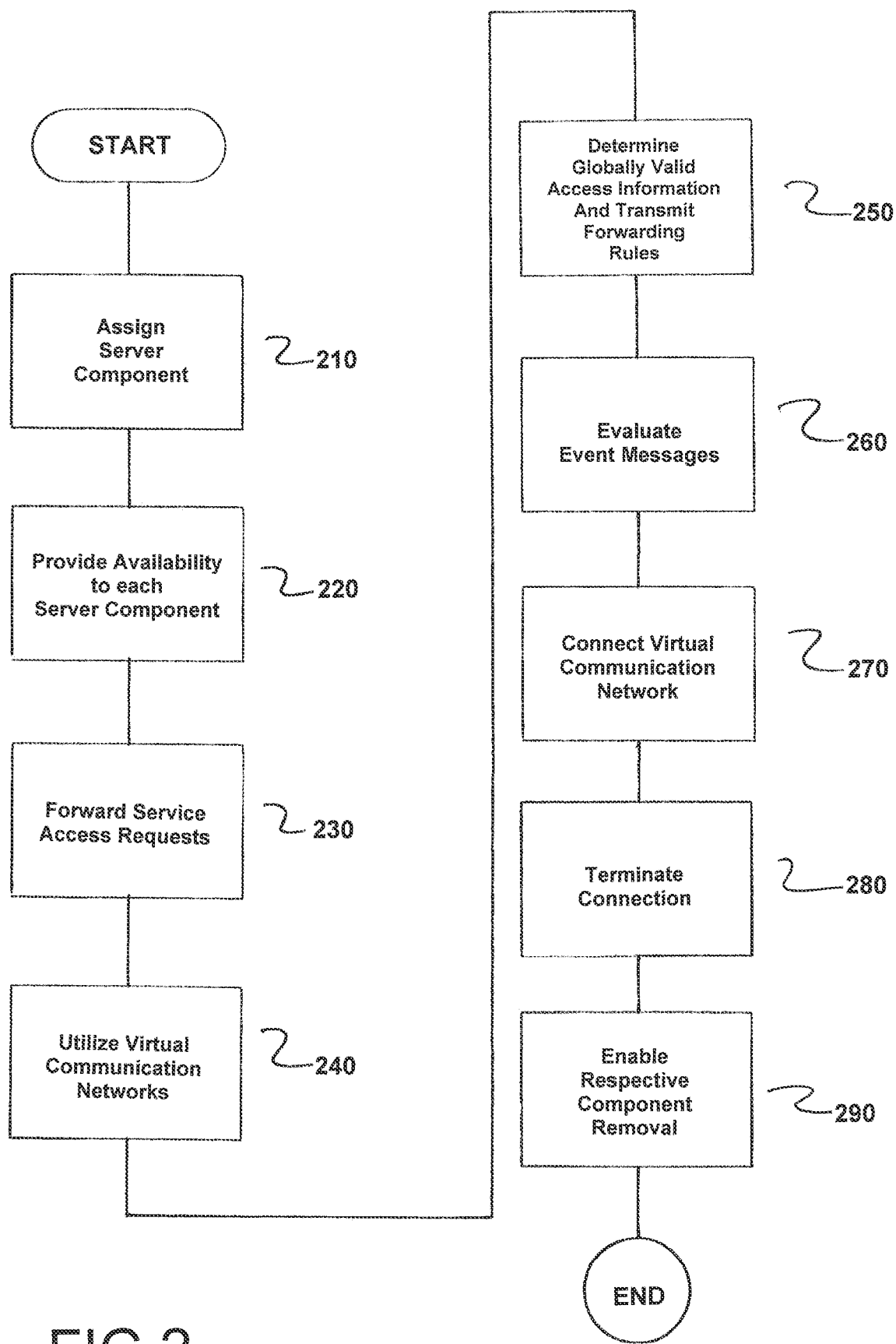
FIG. 2 is a flowchart of the method in accordance with the invention.

FIG. 2 is a flowchart of the method for providing time critical services via a flow control environment in accordance with the invention. The method comprises assigning to each service a server component 113 that comprises at least one application instance and is formed by a flow control component that is loadable into the flow control environment 112, as indicated in step 210. In accordance with the method, the flow control component is executable within the flow control environment 112.

Next, availability of a dedicated virtual communication network 114 is provided to each server component via the flow control environment, as indicated in step 220.

Next, a reverse proxy 101 of a subnetwork 100 comprising the flow control environment forwards service access requests 11 for utilization of the services outside the subnetwork in accordance with predefined forwarding rules 121 to the respective server component via the virtual communication network of said server component, as indicated in step 230.

Next, virtual communication networks are each used for all application instances of the respective server component to forward the service access requests 11, as indicated in step 240.

Next, a configuration unit 102 for the reverse proxy 101 determined globally valid access information 131 in each case for addressing information that is valid within the subnetwork 100 and that is assigned to at least one of the server components 113 and their virtual communication networks 114, and the configuration unit 102 for the reverse proxy 101 transmits, forwarding rules 121 mapping the access information to the reverse proxy, as indicated in step 250.

Next, the configuration unit 102 evaluates event messages 123 from the flow control environment 112 to determine whether virtual communication networks 114 are to be set up or deleted within the flow control environment, as indicated in step 260.

Next, the configuration unit 102 connects a virtual communication network that is to be newly set up to the reverse proxy 101 via a first control command C1 directed at the flow control environment, as indicated in step 270.

Next, the configuration unit terminates, a connection between a virtual communication network to be deleted and the reverse proxy via a second control command C2 directed at the flow control environment, as indicated in step 280.

Next, the configuration unit 102 enables a removal of the respective component 113 from the flow control environment via a third control command C3 directed at the flow control environment upon termination of the connection between the virtual communication network 114 to be deleted and the reverse proxy 101, as indicated in step 290.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for providing time-critical services via a flow control environment, the method comprising:
assigning to each service a server component which comprises at least one application instance and is formed by a flow control component which is loadable into the flow control environment, the flow control component being is executable within the flow control environment;
providing availability of a dedicated virtual communication network to each server component via the flow control environment;

forwarding, by a reverse proxy of a subnetwork comprising the flow control environment, service access requests for utilization of the services outside the subnetwork in accordance with predefined forwarding rules to the respective server component via the virtual communication network of said server component;

utilizing each virtual communication networks for all application instances of the respective server component to forward the service access requests;

determining, by a configuration unit for the reverse proxy, globally valid access information in each case for addressing information which is valid within the subnetwork and which is assigned to at least one of the server components and their virtual communication networks, and transmitting, by the unit for the reverse proxy, forwarding rules mapping the access information to the reverse proxy;

evaluating, by the configuration unit, event messages from the flow control environment to determine whether virtual communication networks are to be set up or deleted within the flow control environment;

connecting, by the configuration unit, a virtual communication network which is to be newly set up to the reverse proxy via a first control command directed at the flow control environment;

terminating, by the configuration unit, a connection between a virtual communication network to be deleted and the reverse proxy via a second control command directed at the flow control environment; and enabling, by the configuration unit, a removal of the respective component from the flow control environment via a third control command directed at the flow control environment upon termination of the connection between the virtual communication network to be deleted and the reverse proxy.

2. The method as claimed in claim 1, wherein the globally valid access information comprises addressing information and access authorizations; and wherein the access authorizations are made available following successful authentication of at least one of a user and device.

3. The method as claimed in claim 2, wherein the forwarding rules map authorizations for selected at least one of users and devices to access selected services.

4. The method as claimed in claim 3, wherein the addressing information valid within the subnetwork comprises at least one of communication network addresses, port numbers, host names and complete domain names.

5. The method as claimed claim 2, wherein the addressing information valid within the subnetwork comprises at least one of communication network addresses, port numbers, host names and complete domain names.

6. The method as claimed in claim 1, wherein the addressing information valid within the subnetwork comprises at least one of communication network addresses, port numbers, host names and complete domain names.

7. The method as claimed in claim 1, wherein the configuration unit determines whether an assigned virtual communication network is already present for a flow control component which is to be loaded into the flow control environment and which is to be executed in the flow control environment; and wherein the configuration unit instructs the flow control environment to utilize this virtual communication network for a connection between the flow control component and the reverse proxy, if the assigned virtual communication network is present.

8. The method as claimed in claim 7, wherein if an assigned virtual communication network is absent, then the configuration unit instructs the flow control environment to set up a virtual communication network within the flow control environment for the server component formed by the flow control component and to use this virtual communication network to connect the flow control component to the reverse proxy.

9. The method as claimed in claim 1, wherein the flow control components are or comprise software containers which, isolated from other software containers or container groups, each execute within the flow control environment on a host operating system of a server device.

10. The method as claimed in claim 9, wherein the flow control environment comprises a container engine via which virtual resources are created, deleted or linked; the virtual resources comprising software containers, virtual communication networks and connections assigned thereto.

11. The method as claimed in claim 1, wherein a flow control component is loaded in each case for each application instance into the flow control environment and is executed within the flow control environment.

12. The method as claimed in claim 1, wherein at least one directory service component makes the globally valid access information available for the use of the services outside the subnetwork.

13. The method as claimed in claim 1, wherein the virtual communication networks at least one of (i) each comprise virtual Ethernet point-to-point connections and (ii) are each formed in each case by a virtual bridge within the flow control environment.

14. A system for providing time-critical services via a flow control environment, comprising:
a flow control environment;
a subnetwork comprising the flow control environment;
a reverse proxy of the subnetwork;
a configuration unit for the reverse proxy;
a plurality of server components each assigned to a service, and each comprising at least one application instance and being formed by a flow control component which is loadable into the flow control environment and which is executable within the flow control environment;
wherein the flow control environment is configured such that a dedicated virtual communication network is made available to each server component;
wherein the reverse proxy is configured to forward service access requests for utilization of services outside the subnetwork according to predefined forwarding rules to the respective server component via the virtual communication network of said server component;
wherein the virtual communication networks are configured to each be used to forward the service access requests for all application instances of the respective server component;
wherein the configuration unit for the reverse proxy is configured in each case to determine globally valid access information in each case for addressing information which is valid within the subnetwork and which is assigned to at least one of the server components and their virtual communication networks, and configured to transmit forwarding rules mapping the access information to the reverse proxy;
wherein the configuration unit is further configured to evaluate event messages from the flow control environment to determine whether virtual communication networks are to be set up or deleted within the flow control environment;

wherein the configuration unit is further configured to connect a virtual communication network which is to be newly set up to the reverse proxy via a first control command directed at the flow control environment;

wherein the configuration unit is further configured to terminate a connection between a virtual communication network to be deleted and the reverse proxy via a second control command directed at the flow control environment; and wherein the configuration unit is further designed and configured to enable a removal of the respective server component from the flow control environment by means of a third control command directed at the flow control environment upon termination of the connection between the virtual communication network to be deleted and the reverse proxy.

* * * * *